Patented Jan. 9, 1940

2,186,893

UNITED STATES PATENT OFFICE 2,186,893

DISINTEGRATION OF VEGETABLE FIBROUS MATERIALS

Alfons Bayerl, Wolfen, Bitterfeld, Germany, assignor to I. G. Farbenindustrie Aktiengesellschaft, Frankfort-on-the-Main, Germany No Drawing. Application May 7, 1937, Serial No. 141,251. In Germany May 13, 1936

5 Claims. (Cl. 92—9)

My present invention relates to an improvement in a process for disintegrating wood and other cellulose-containing material and more particularly to such a process wherein nitric acid is used for decomposing the lignin and the other compounds accompanying the cellulose.

In my copending application Ser. No. 62,815, filed February 7, 1936, there is described a process for disintegrating wood in which the wood is placed in a pressure vessel and covered therein with a weak nitric acid of at least 4 per cent. strength, the initial temperature being at most 60° C. and the air being pumped from the vessel or not as desired. In the closed vessel in which the acid is continuously circulated by pumping, the temperature rises in the course of some hours to 70 to 90° C. and the excess pressure produced is maintained at several atmospheres with occasional blowing off, until the reaction is complete. After this single stage operation the nitric acid is drawn off and usual after-treatment with alkali and washing follow. The process is characterized by its small consumption of nitric acid which lends it commercial efficiency.

The present invention reduces still further the consumption of nitric acid and in consequence of the use of larger pieces of wood with less waste splinter a larger yield of cellulose is obtained. The invention consists in a two-stage process and is applicable to various vegetable fibers, for instance, wood, straw, grasses or the like; it will here be described as applied to wood.

The wood in the form of shavings is introduced into an acid resisting pressure vessel which is evacuated of air; the wood is covered with a solution of nitric acid of 10 to 15 per cent. strength by volume, the amount being in excess of that necessary to disintegrate the wood. When the whole of the nitric acid has been introduced there is produced in the vessel an excess pressure of about 5 atmospheres by introducing compressed air or by a pressure development during the reaction after the vacuum has been broken. The acid soaks energetically into the wood. At first by suitable attemperating the acid the temperature in the vessel is maintained at about 30 to about 40° C., but in the course of a few hours the temperature is allowed to rise gradually to about 40 to about 50° C. respectively, the heat of reaction being used for this purpose; the pressure is kept the same as in the first phase by suitable blowing off the carbon dioxide which is produced. The wood is by now saturated with the quantity of nitric acid necessary for the disintegration and, as indicated by the heat of the reaction, the disintegration has already been begun. The acid which has not been taken up by the shavings is now removed and after being made up to strength may serve for the next disintegration; then so much hot water of 80 to 85° C. is introduced that the temperature in the vessel is about 70° C. In the course of 6 to 8 hours the temperature is raised by stages to about 90° C. to about 95° C. In this second phase the disintegration proper proceeds. If a medium or high viscosity pulp is required the gases formed in this stage of the process are entirely blown off so that no pressure is produced in the vessel. When a low viscosity pulp is desired an excess pressure is maintained also in the second phase, the amount of this being adjusted to suit the desired viscosity of the pulp.

The water feebly acid with nitric acid is now run off and the pulp is freed as completely as possible from the adhereing acid by washing with hot water or hot alkali lye. By the usual after-treatment with a warm, weak caustic soda solution the oxidized lignin constituents are dissolved. The pulp is now washed free from alkali and is then in a form easily separated into fibers and ready for further operation for producing pure cellulose.

The consumption of nitric acid owing to the mode of application in the first stage of the process may be limited to the smallest quantity necessary for the disintegration.

The following examples illustrate the invention:

*Example 1.*—An acid resistant pressure vessel made of Krupp's rustless steel is charged with 100 kilos of air-dry beech-wood shavings and the air is pumped from it in the course of 30 minutes until the vacuum is about 60 mm.; 300 liters of nitric acid solution of 13 per cent. strength by volume are then run in. When the whole of the acid has been added, air is admitted to break the vacuum and is then pumped in until a pressure of 5 atmospheres has been attained. The temperature of the acid introduced is so adjusted that after the vessel has been charged the initial temperature therein is about 35° C. In the course of 3 hours during which the acid is continuously circulated by pumping, the temperature due to the exothermic reaction rises uniformly to 45° C. By permitting the carbon dioxide produced to escape, pressure in the vessel is kept constant at about 5 atmospheres. The wood has by now become completely saturated with the quantity of nitric acid necessary for the disintegration, so that the excess acid may be run off. 170 liters of water at 85° C. are then added and the temperature in the vessel is adjusted to 70° C. This temperature is raised by stages in the course of about 7 hours to 90° C., if necessary with the addition of heat, the gases being free to escape so that the pressure does not rise and the disintegration proper of the wood is carried through without pressure.

The feebly acid water (containing about 0.7 per cent. by volume of $HNO_3$) is now run out and the wood is freed from adhering acid as far as possible by washing with hot water or hot waste alkali lye. There follows a usual after-treatment with a caustic soda lye of 3 per cent. strength by volume continuing for about 2 hours at 80° C.; in this manner the oxidized lignin constituents are dissolved. The pulp is then washed free from alkali, whereby it is obtained in a form easily separated into fibers very suitable for being further worked into pure highly viscous cellulose.

For obtaining a cellulose of low viscosity, an excess pressure of one or more atmospheres should be maintained after the addition of the hot water, that is to say, in the second phase; after-treatment remains the same.

*Example 2.*—100 kilos of air-dry pine-wood shavings are introduced into an acid resistant pressure vessel and the air is pumped from it until the vacuum is about 60 mm. mercury. Then 400 liters of nitric acid solution of 14 per cent. strength by volume are soaked in. When the whole of the acid has been added, the vacuum is broken by the admission of air and by pressing air into the vessel a pressure of 3 atmospheres is attained. The temperature of the acid is so adjusted that after the vessel has been charged the initial temperature therein is about 40° C. While continuously circulating the acid by pumping, the temperature is allowed to rise in the course of 3 hours due to the exothermic reaction uniformly to 50° C. By permitting the carbon dioxide formed to escape, pressure in the vessel is kept constant at about 3 atmospheres. The wood is now completely saturated with the acid and contains the quantity of nitric acid necessary for the disintegration and the excess of acid is allowed to run off. 185 liters of water at 85° C. are then introduced into the vessel and the temperature in the vessel is adjusted to 70° C. This temperature is raised by stages in the course of 8 hours to 95° C., if necessary by heating and an over-pressure of 1 atmosphere is maintained in the vessel until the disintegration is complete. The pulp thus obtained is freed from acid and the oxidized lignin constituents are further worked up as indicated in Example 1.

It is obvious that my invention is not limited to the foregoing examples or to the specific details given therein and practically the process may be varied within the limits of temperature and acid concentration indicated in the claims following hereafter.

What I claim is:

1. In the process for disintegrating wood by means of nitric acids the steps which comprise impregnating the wood under vacuum with a solution of nitric acid of about 10 to about 15 per cent. strength by volume, completing the impregnation by applying pressure up to about 5 atmospheres, the initial temperature of about 30° C. to about 40° C. being raised to about 40 to about 50° C. respectively, while maintaining said pressure, removing the nitric acid not taken up by the wood, adding hot water so that the temperature is about 70° C. and completing the disintegration at a temperature of about 70 to about 95° C.

2. In the process for disintegrating wood by means of nitric acids the steps which comprise impregnating the wood under vacuum with a solution of nitric acid of about 10 to about 15 per cent. strength by volume, completing the impregnation by applying pressure up to about 5 atmospheres, the initial temperature of about 30 to about 40° C. being raised to about 40 to about 50° C. respectively, while maintaining said pressure, removing the nitric acid not taken up by the wood, adding hot water so that the temperature is about 70° C. and completing the disintegration at a temperature of about 70 to about 95° C. at atmospheric pressure.

3. In the process for disintegrating wood by means of nitric acids the steps which comprise impregnating the wood under vacuum with a solution of nitric acid of about 10 to 15 per cent. strength by volume, completing the impregnation by applying pressure up to about 5 atmospheres, the initial temperature of about 30° to about 40° C. being raised to about 40 to about 50° C. respectively, while maintaining said pressure, removing the nitric acid not taken up by the wood, adding hot water so that the temperature is about 70° C. and completing the disintegration at a temperature of about 70 to about 95° C. and under a pressure of up to about 5 atmospheres.

4. The process for disintegrating beech-wood shavings which comprise setting about 100 kg. of the air-dry shavings under vacuum, adding 300 liters of nitric acid of 13 per cent. strength, breaking the vacuum by air, providing a pressure of 5 atmospheres, the initial temperature being 35° C., circulating the acid and raising the temperature to about 45° C., keeping the pressure at about 5 atmospheres, removing the acid not taken up by the wood, adding 170 liters of water of 85° C., raising the temperature in the course of about 7 hours to 90° C. and completing the disintegration at atmospheric pressure.

5. The process for disintegrating pine-wood shavings which comprises setting about 100 kg. of the air-dry shavings under vacuum, adding 400 liters of nitric acid of 14 per cent. strength, breaking the vacuum by air, providing a pressure of 3 atmospheres, the initial temperature being 40° C., circulating the acid and raising the temperature to about 50° C., keeping the pressure at about 3 atmospheres, removing the acid not taken up by the wood, adding 185 liters of water of 85° C., raising the temperature in the course of about 8 hours to 95° C. and completing the disintegration at a pressure of one atmosphere gauge.

ALFONS BAYERL.